United States Patent [19]

McCune

[11] 4,253,951

[45] Mar. 3, 1981

[54] METHOD OF REDUCING AEROSOLIZATION OF WASTEWATER

[75] Inventor: Homer W. McCune, Cincinnati, Ohio

[73] Assignee: The Procter & Gamble Company, Cincinnati, Ohio

[21] Appl. No.: 117,316

[22] Filed: Jan. 31, 1980

Related U.S. Application Data

[63] Continuation of Ser. No. 959,405, Nov. 9, 1978, abandoned.

[51] Int. Cl.³ ............................................. C02F 1/00
[52] U.S. Cl. ................. 210/749; 4/DIG. 9;DIG. 10; 210/764; 210/631
[58] Field of Search ................... 4/DIG. 9, DIG. 10; 55/87; 210/2–9, 13, 15, 17, 18, 42 R, 54, 58, 59, 60, 64; 252/180, 319

[56] References Cited

U.S. PATENT DOCUMENTS

| | | | |
|---|---|---|---|
| 3,107,216 | 10/1963 | Hamilton | 4/DIG. 9 |
| 3,184,336 | 5/1965 | Murphy | 210/54 |
| 3,194,758 | 7/1965 | Lissant | 210/54 |
| 3,291,729 | 12/1966 | Martin | 210/13 |
| 3,862,243 | 1/1975 | Bellos | 210/59 |
| 3,897,357 | 7/1975 | Carmello | 252/106 |

FOREIGN PATENT DOCUMENTS

| | | |
|---|---|---|
| 2602514 | 7/1976 | Fed. Rep. of Germany . |
| 53-31708 | 3/1978 | Japan . |
| 53-31709 | 3/1978 | Japan . |
| 53-58507 | 5/1978 | Japan . |

OTHER PUBLICATIONS

"Polymers for Sewer Flow Control," *Fed. Water Poll. Control Adm.*, Dept. of Interior, 1969.
Gerba et al., "Microbiological Hazards of Household Toilets", *Applied Microbiology*, Aug. 1975, pp. 229–237.
Technical Service Bulletin LF. 72518, Union Carbide, 1973.
Polyox Trade Bulletin, Union Carbide, 1973.
Polyox Trade Bulletin, F–43273, Union Carbide, 1971.
Bailey et al., "Poly(ethylene oxide)", *Academic Press*, 1976, p. 164.

*Primary Examiner*—Peter A. Hruskoci
*Attorney, Agent, or Firm*—Ronald L. Hemingway; Richard C. Witte

[57] ABSTRACT

Aerosolization of wastewater such as occurs in the flushing of toilets and in sewage treatment, is minimized by addition of from about 1 to about 30 ppm of high molecular weight poly(ethylene) oxide polymers into said wastewater.

4 Claims, No Drawings

METHOD OF REDUCING AEROSOLIZATION OF WASTEWATER

This is a continuation of application Ser. No. 959,405, filed Nov. 9, 1978, now abandoned.

TECHNICAL FIELD

The present invention relates to the treatment of wastewater which contains human waste, so as to reduce the aerosolization which can occur when said wastewater is subjected to turbulence, as for example, in the flushing of toilets or in secondary sewage treatment facilities. This is accomplished by incorporating into the wastewater from about 1 ppm to about 30 ppm of a water-soluble poly(ethylene oxide) polymer having a molecular weight of about 100,000 to about 7,000,000.

BACKGROUND ART

The agitation of aqueous systems which contain microbes produces aerosol particles which contain the microbes. Aerosol particles, as commonly designated, include the true aerosol particles of from a few millimicrons to about 1 micron in diameter, and larger particles which can have diameters of more than 100 microns. (See *Encyclopaedia Britainnica, Micropaedia,* Vol. I, page 114, 15th Ed., 1975) These aerosol particles, are forcefully ejected from the aqueous system by agitation and can be subsequently carried by air currents, whereupon they can enter the human body through respiration or through hand-to-mouth contact with surfaces upon which the particles eventually settle. Baylor et al., *Science,* 198, pp. 575–580, November 1977, report that virus is transferred from sea water into the surrounding air by aerosolization from the surf, and that the concentration of virus in the aerosol is greater than in the main body of sea water. They indicate that this has public health implications in regions where sewage is dumped into coastal waters.

Gerba et al. in *Applied Microbiology* 30,2:pp. 229–237 (1975) describe a study in which it was found that bacteria and virus seeded into toilet bowls appeared in aerosol droplets produced by the toilet during flushing, and that these droplets remained airborne long enough to settle on surfaces throughout the bathroom.

From the foregoing it is apparent that a reduction in aerosolization from wastewater containing human waste is desirable as a means of reducing the potential for disease transmission from said wastewater.

It is an object of the present invention to reduce the potential for disease transmission from wastewater by incorporating into said wastewater a material which reduces the tendency of the wastewater to form aerosol particles when subjected to turbulence.

It is a further object of the invention to reduce the potential for disease transmission from flushing toilets by dispensing into the flush water an agent which reduces aerosolization.

It is a further object of the invention to reduce the potential for disease transmission from aerated or agitated sewage treatment processes by incorporating an agent which reduces aerosolization into the wastewater which is treated by such processes.

The attainment of these and other objects will be apparent from the following description.

DISCLOSURE OF INVENTION

In accordance with the present invention, the incorporation of levels of from about 1 ppm to about 30 ppm (preferably from about 3 to about 15 ppm) of high molecular weight, water-soluble poly(ethylene oxide) resins into wastewater significantly reduces the tendency of the wastewater to aerosolize when subjected to turbulence, as in the flushing of toilets or in the agitation or aeration of sewage in a sewage treatment facility.

The aerosol reduction agents utilized in the practice of the present invention are water-soluble poly(ethylene oxide) resins having molecular weights of from about 100,000 to about 7,000,000. The preferred molecular weight range is from about 1,000,000 to about 7,000,000. These polymeric resins are commercially available under the trade name Polyox$^R$ from Union Carbide Corporation. They can be prepared by the polymerization of ethylene oxide, utilizing an alkaline earth metal oxide as catalyst.

Technical Service Bulletin LF 42518 published by Union Carbide Corporation in 1973 indicates that the Polyox resins, when incorporated into aqueous grinding and cutting fluids at levels of 50–100 ppm, are effective in reducing mists (i.e., aerosolization) from these aqueous systems. Bulletin F-43273 published by Union Carbide Corporation in 1971 discloses the use of 10–30 ppm Polyox resin in water passing through conduits such as storm sewers and fire hoses in order to reduce hydrodynamic drag and thereby increase the rate of flow through the conduit. It does not appear that the prior art has heretofore recognized that levels of high molecular weight, water-soluble poly(ethylene oxide) resins as low as 1–30 ppm are effective in reducing aerosolization of aqueous systems such as wastewater. The term "wastewater" as used herein means water which contains human body waste, i.e., fecal matter or urine.

The present invention in its broadest aspect comprises a method for reducing aerosolization of wastewater which is subjected to turbulence, said method comprising the step of incorporating into said wastewater from about 1 ppm to about 30 ppm (preferably from about 3 ppm to about 15 ppm of a water-soluble poly(ethylene oxide) resin having a molecular weight of from about 100,000 to about 7,000,000, preferably from about 1,000,000 to about 7,000,000, and most preferably from about 1,000,000 to about 5,000,000. The poly(ethylene oxide) resin can be incorporated into the water prior to the introduction of the human waste or afterwards. The important point is that the resin be present with the waste in the wastewater prior to the time the wastewater is subjected to turbulence.

The present invention not only reduces the formation of aerosol particles having diameters of up to about 100 microns, as described hereinabove; it also reduces the formation of larger size particles such as jet droplets which have diameters of up to about 1500 microns, and even splashes. For convenience in describing the present invention, the term "aerosolization" is used in a general sense to refer to the formation and expulsion into the air of particles caused by the agitation of wastewater, regardless of the size of the particles.

The invention can be used in treating individual toilets to prevent aerosolization during flushing and it can also be utilized in secondary sewage treatment facilities to prevent aerosolization caused by turbulent movement of the sewage, as for example, during aeration or agitation.

In treating individual toilets an appropriate amount of the poly(ethylene oxide) resin can be dispensed directly into the stream of water entering the bowl. In toilets of the usual household type which comprise a flush tank and a bowl, an appropriate amount of the resin can be dissolved in the entire contents of the tank water between flushes. In whatever way the resin is dispensed to the toilet, it is important that the water remaining in the bowl after the flush contain 1–30 ppm of the resin. This insures that the wastewater which is in the bowl at the beginning of the next succeeding flush will contain sufficient resin to suppress aerosolization. This can be accomplished by having the required amount of resin present in all or substantially all of the water which is used to flush the toilet (for example, in a tank-type toilet, the required amount of resin can be dissolved in the tank water between flushes) or, alternatively, it can be accomplished by directly dispensing a sufficient amount of resin to the bowl during the flush or at the end of the flush so as to produce 1–30 ppm of resin in the bowl after the flush cycle is completed.

In a typical household toilet equipped with a flush tank, the water in the tank flows into the bowl through a flapper valve during the flush cycle. While water is flowing out of the tank new water is entering the tank from the household water supply and some of this new water will flow through the flapper valve into the bowl before the flapper valve closes. Also some new water will flow directly into the bowl through the standpipe during the flush cycle. If, in practicing the present invention, the poly(ethylene oxide) resin is dispensed into the bowl by dissolving it in the water in the flush tank between flushes, it is apparent that because of the "new" water which is introduced during the next flush, the concentration in the tank should be higher than the target concentration for the bowl. The bowl water subsequent to each flush is comprised of from 10% to 65% original tank water, the remainder being "new" water. Accordingly, the concentration of resin in the tank water should be from about 1.5 to 10 times the concentration desired in the bowl, depending upon the model and operating conditions of tank-type toilet used. Alternatively, the resin can be dispensed late in the flush cycle to attain more efficient dispensing of the resin, i.e., less of the newly added resin will be flushed from the bowl during the time it is being added to the bowl and there will be less dilution by incoming water.

In the treatment of toilets, the poly(ethylene oxide) resins of the present invention can be used in conjunction with other agents which are conventionally used to treat the toilet. Such agents include, for example, dyes, perfumes, sanitizers such as sodium hypochlorite and cetyl pyridinium chloride, surfactants such as the alkali metal and ammonium salts of $C_{12}$ to $C_{18}$ alkyl sulfates, alkyl sulfonates and alkylbenzene sulfonates and the reaction products of 10 to 30 moles of ethylene oxide with a hydrophobic base such as a $C_{10}$ to $C_{20}$ alcohol or a ($C_6$ to $C_{12}$ alkyl) phenol, and detergency builder salts such as alkali metal phosphates, pyrophosphates, carbonates and silicates.

In sewage treatment plants wastewater is first subjected to a "primary" treatment which involves settling of solids. The wastewater is then put through a "secondary" treatment to remove finely divided or dissolved organics. In the secondary treatment a biologically active floc or slime is utilized in an aerobic process to convert the soluble organics into insoluble biomass through sorption and metabolism by the microbial population in the floc or slime. Two basic processes are used in secondary treatment. These are:
(a) The trickling filter process, which involves spraying the wastewater, via a rotating arm, over a substrate which is rich in biological film to remove the soluble organics.
(b) The activated-sludge process, which involves aeration of a biological floc to remove soluble organics by precipitation with the floc.

Both of these secondary treatment processes, as well as a variety of similar aerated or agitated secondary treatment systems, involve subjecting the wastewater to turbulence, and thereby produce aerosolization. The aerosol which is produced is rich in microbes, including bacterial and viral pathogens which have not been subject to either removal or kill in the primary treatment. In the practice of the present invention the poly(ethylene oxide) resin is introduced (e.g., by a metering device) into the wastewater upstream of the secondary treatment unit so as to obtain a level of 1 to 30 ppm of resin in the wastewater.

The water-soluble poly(ethylene oxide) resins of the present invention are sold commercially in the form of granular powders which are freely soluble in water. In the practice of the present invention the granular resin can be added directly to the wastewater or to water which will subsequently contain waste, however, in order to provide ease of handling and metering and to facilitate the rapid attainment of uniform concentration in the wastewater, it is preferred that the resin be predissolved in water or predispersed in an inorganic salt solution or in an organic solvent, before addition to the wastewater. High shear mixing should be avoided in dissolving or dispersing the resin, since this can result in degradation of the polymer molecule (See Union Carbide Corporation Bulletin F-42933 "How to Dissolve POLYOX Water-Soluble Resin," published in May 1970, and incorporated by reference herein).

The invention will be illustrated by the following examples:

EXAMPLE I

This experiment illustrates the effectiveness of a representative poly(ethylene oxide) resin of the invention in suppressing the formation of microbe-containing aerosols during toilet flushing.

The experiment is conducted with an American Standard Cadet Toilet which is fitted with a hollow cubical chamber which has base dimensions of 67.3 cm × 62.2 cm, and is 52.7 cm in height (all dimensions are interior). The chamber is made of clear plexiglass and has an opening in its bottom wall (base) which is of the same size and shape as the rim of the toilet bowl. This chamber rests on top of the toilet bowl, thereby providing an enclosed volume of air above the bowl in which aerosol particles from the bowl can be trapped.

Prior to flushing, the water in the bowl is innoculated with MS-2 bacteriophage, a virus which destroys *E. Coli* bacteria. Clean petri dishes are placed on the interior bottom surface of the chamber (i.e., the surface which surrounds, and is parallel to, the rim of the toilet bowl). When the toilet is flushed, aerosol particles containing the MS-2 bacteriophage, rise into the chamber and settle on the petri dishes. Each petri dish is then overlaid with a soft agar medium containing *E. Coli*, and the culture is incubated to form a lawn of *E. Coli* cells on the dish. At each point where an MS-2 phage has landed on the petri dish, there remains a small visible void in the lawn of E. Coli which is formed, due to destruction of E. Coli by the MS-2 phage. These voids are counted, and their number provides a measure of the amount of aerosolization which occurred during the flush. The procedure used for preparing MS-2 bacteriophage was substantially the same as described at Pages 3 to 9 of Experiments in Microbiological Genetics, Clowes and Hayes; John Wiley & Sons, Inc., New York (1968), incorporated by reference herein.

Details of the aerosolization test procedure are as follows:

1. Tryptacase Soy-Salt broth is innoculated with E. Coli about three hours prior to the experiment and is incubated with agitation at 37° C.

2. Thirty-three 5 ml. Trypticase Soy-Salt soft agar tubes are melted and held in a water bath at 47° C.

3. Thirty-three 90 mm.×90 mm. square petri dishes are labeled, and if necessary, placed in an inverted position in a 37° C. incubator to insure that the plates are free of condensation water.

4. The toilet bowl is cleaned with Clorox$^R$ (a product of The Clorox Company). This is done by pouring one-half cup (about 119 ml.) of Clorox into the bowl, brushing the entire interior of the bowl, waiting 10 minutes, and then flushing the toilet. The toilet is then flushed an additional five times.

5. 15 ml. of 0.5% sodium thiosulfate is added to the flush tank, and the toilet is flushed. This procedure is repeated four times in order to ensure that all chlorine has been removed from the system. If an aerosol suppression agent is to be used in the experiment, it is added in the appropriate amount to the tank during each of these four flushes in order to ensure distribution throughout the system. The appropriate amount of aerosol suppression agent is added as the flush is initiated to simulate automatic dispensing. After the fourth flush, 15 ml. of 0.5% thiosulfate is again added to the tank.

6. The interior surfaces of the chamber are cleaned with a 0.47% solution of "Wescodyne," an iodine-based hard surface disinfectant marketed by West Chemical Products Co. The 33 petri dishes (from 3, above) are placed side-by-side on the interior bottom surface of the chamber, and the chamber, without its top in place, is mounted on the toilet bowl.

7. From an MS-2 lysate having a titer of about $10^{11}$ plaque-forming units per ml., the bowl is innoculated to achieve a level of approximately $10^8$ plaque-forming units of bacteriophage per ml. of bowl water. 50 grams of human feces which has been sterilized (by autoclaving) are also added to the bowl.

8. The top is then placed on the chamber.

9. The toilet is flushed, and thirty minutes are allowed to elapse to provide time for the aerosol particles to settle on the petri dishes. When aerosol suppression agent is to be tested, the appropriate amount is added as the flush is initiated to simulate automatic dispensing.

10. The chamber is disassembled and covers are placed on the petri dishes.

11. 0.5 ml. of E. Coli broth culture is added to each molten Trypticase Soy-Salt soft agar tube (from 2, above), the tops are removed from the petri dishes (from 10, above) and each petri dish is overlaid with the contents of a single soft agar tube.

12. The soft agar is allowed to solidify, the petri dishes are inverted, and they are incubated at 37° C. overnight (approximately 12–18 hours).

13. After the incubation period, the total number of void spots (plaques) on the petri dishes are counted and recorded.

Using the foregoing experimental technique, tests were run to evaluate the ability of a representative poly-(ethylene oxide) of the present invention to suppress the formation of aerosol from the toilet. The material used was Polyox C, a poly(ethylene oxide) having a mean molecular weight of 4–6 million, marketed by Union Carbide Corporation. The Polyox C was added to the system as indicated in Steps 5 and 9 (above) by dispensing 0.080 grams of the material as a saturated NaCl suspension in the flush tank during each flush. This produces a concentration of about 3–5 ppm Polyox C in the bowl. The Polyox C concentration actually produced in the bowl was determined by analysis of the bowl water after the flush in Step 9. The test was replicated three times. A control, in which no Polyox C was added to the system was also replicated three times. The results are shown in Table I.

TABLE I

| Aerosolization Test Results | | | |
|---|---|---|---|
| | Polyox C | | |
| | Run 1 | Run 2 | Run 3 |
| Titer in bowl before flushing (plaque-forming units/ml.) | $2.2 \times 10^8$ | $2.6 \times 10^8$ | $4.3 \times 10^8$ |
| Titer in bowl after flushing (plaque-forming units/ml.) | $1.3 \times 10^6$ | $9.4 \times 10^6$ | $1.1 \times 10^6$ |
| Plaques counted on petri dishes | 2 | ND* | ND* |
| Polyox C level in bowl (ppm) | 3.5 | 3.2 | 4.0 |
| | Without Polyox C | | |
| | Run 1 | Run 2 | Run 3 |
| Titer in bowl before flushing (plaque-forming units/ml.) | $2.4 \times 10^7$ | $2.9 \times 10^8$ | $5.9 \times 10^8$ |
| Titer in bowl after flushing (plaque-forming units/ml.) | $1.5 \times 10^6$ | $7.4 \times 10^6$ | $5.9 \times 10^6$ |
| Plaques counted on petri dishes | 580 | 626 | 735 |

*ND = None detected

These results show clearly the effectiveness of the present invention in suppression of aerosolization of wastewater from the toilet.

EXAMPLE II

This example illustrates the use of the present invention in the secondary treatment of sewage.

The secondary treatment unit is of the trickling filter type. In this type of unit, wastewater effluent obtained from the primary treatment (sedimentation) unit is distributed over a contact bed in the form of droplets, thin sheets or spreading jets from fixed or rotating spray nozzles which are positioned about 3 inches above the bed, on revolving arms. The bed comprises broken stone or other contact material which is covered with biological growths.

As the wastewater flows from the primary treatment unit, and prior to the time it is fed to the spray nozzles in the secondary treatment unit, a poly(ethylene oxide) resin having a molecular weight of 5 million is metered into the wastewater. The resin is in the form of a dispersion consisting of 10% by weight of resin in a saturated aqueous NaCl solution. The dispersion is metered into the wastewater at a rate so as to provide a concentration of about 5 ppm resin. Use of the present invention as described in this example results in a significant reduction in aerosolization in the secondary treatment unit compared to the situation where the poly(ethylene oxide) resin is not added to the wastewater.

What is claimed is:

1. A method of reducing aerosolization of wastewater from a flush toilet during the next succeeding flushing of said toilet, said method comprising the step of dispensing into the bowl of said toilet, prior to the next succeeding use and flushing of said toilet, a sufficient amount of a water-soluble poly(ethylene oxide) resin so as to produce a concentration of said resin of from about 1 to about 30 ppm in the bowl of said toilet, said resin having a molecular weight of from about 100,000 to about 7,000,000.

2. The method of claim 1 wherein the toilet comprises a flush tank and a bowl and wherein the poly(ethylene oxide) resin is dispensed to the water in the flush tank during the flush and is dispensed into the bowl upon flushing of the toilet.

3. The method of claim 2 wherein the poly(ethylene oxide) resin has a molecular weight of from about 1,000,000 to about 7,000,000.

4. The method of claim 3 wherein the concentration of the said poly(ethylene oxide) resin produced in the bowl is from about 3 ppm to about 15 ppm.

* * * * *